United States Patent [19]

Bowman et al.

[11] Patent Number: 4,910,579

[45] Date of Patent: Mar. 20, 1990

[54] SEMICONDUCTOR INTEGRATED DISPLAY DEVICE WITH OVERLAPPING ELECTRODES

[75] Inventors: Paul Bowman; Anthony R. Cowburn, Eastleigh; Dennis S. Mansbridge, Totton; William M. Morgan; Frank T. Moth, both of Eastleigh, all of Great Britain

[73] Assignee: International Business Machines Corporation, Armonk, N.Y.

[21] Appl. No.: 307,189

[22] Filed: Feb. 1, 1989

Related U.S. Application Data

[63] Continuation of Ser. No. 96,689, Sep. 15, 1987, abandoned.

[30] Foreign Application Priority Data

Sep. 26, 1986 [EP] European Pat. Off. ............ 86307408

[51] Int. Cl.4 ...................... H01L 29/44; H01L 27/14
[52] U.S. Cl. .......................................... 357/71; 357/4; 357/30; 357/45
[58] Field of Search ................... 357/30, 71, 45, 4, 68, 357/32

[56] References Cited

U.S. PATENT DOCUMENTS 4,239,346 12/1980 Lloyd .................................... 357/30
4,471,375 9/1984 Oritsuki et al. ........................ 357/30
4,737,833 4/1988 Tabei ..................................... 357/30

FOREIGN PATENT DOCUMENTS

0112417 7/1984 European Pat. Off. ............ 357/71
58-222546 12/1983 Japan .................................... 357/30
62-2566 1/1987 Japan .................................... 357/30

Primary Examiner—Andrew J. James
Assistant Examiner—Jerome Jackson
Attorney, Agent, or Firm—Marc D. Schechter

[57] ABSTRACT

A semiconductor integrated display is disclosed herein in which a matrix of conductive display electrodes is formed over a corresponding matrix of switching devices which are integrated in a single crystal semiconductor chip such that the display electrodes are connected to their respective switching devices through respective conductive paths. The display electrodes are divided into a plurality of subsets each of which is formed in respective layers, so that the display electrodes of an upper subset overlap the edges of the display electrodes of the lower subset. The display electrode layers are separated by intermediate layers of electrically insulating material. The conductive paths from each higher layer subset passes through gaps between electrodes of any lower subset and through the insulating layers to connect their respective electrodes to the corresponding switching devices.

10 Claims, 7 Drawing Sheets

SEMICONDUCTOR INTEGRATED DISPLAY DEVICE WITH OVERLAPPING ELECTRODES

This is a continuation of application Ser. No. 096,689, filed on Sept. 15, 1987, now abandoned.

BACKGROUND OF THE INVENTION

1. Field of the Invention

The present invention relates to semiconductor integrated displays and methods of making such displays.

2. Description of Related Art

In recent years, it has been proposed to integrate small passive displays of the electrochomic or liquid crystal type with an addressable matrix of transistors formed in a silicon or other semiconductor substrate. In such displays, the picture elements (pels) are formed in a corresponding matrix and each element is connected to a respective one of the transistors, which controls its operation. Such displays, up to and including the picture elements, are built employing techniques analogous to those employed in semiconductor integrated circuit manufacturing.

One severe problem encountered with these displays is the lack of contrast between the display in the switched on and switched off modes owing to the gaps between the pels. The gaps between the pels are necessary to electrically insulate one pel from its immediate neighbors. However, although such gaps are small, the cumulative effect of the large number of gaps produces a dark coloration background to the display giving the lack of contrast between the switched on and switched off modes. European patent publication EP-A-0112417 discloses a semiconductor integrated display and method for making the same in which the display electrodes are formed from a layer of silver evaporated over the entire upper surface of a partially formed display and gaps between the individual electrodes are subsequently made by sputter etching. The width of the gaps between each electrode and its immediate neighbors is dictated by the need to electrically isolate each electrode from its neighbors and by the present state of the art of the technique of sputter etching.

A further problem encountered in such displays is that of photoconduction in the semiconductor substrate. If light, which illuminates the display for viewing or projection, penetrates to the substrate, the resulting photoconduction can produce undesirable electrical leakage paths. As a result unselected areas of the display can become colored or the coloration of selected areas of the display can fade. This problem has been recognized in the art and various proposals made to overcome it. One suitable method of overcoming this problem is disclosed in European patent publication EP-A-0112417 and utilizes a metallic light barrier which is at least co-extensive with the gaps between the display electrodes and the semiconductor substrate.

SUMMARY OF THE INVENTION

In the subject invention display electrodes are placed adjacent to each other on different levels enabling the edges of adjacent display electrodes to overlap. This overlapping increases the electrode coverage and leads to an improvement in contrast and an improvement in the light barrier. It also eliminates the need to sputter etch in the production of the display which provides a significant improvement in the efficiency and cost of manufacture.

Accordingly, the present invention provides a semiconductor integrated display in which a matrix of conductive display electrodes is formed over a corresponding matrix of switching devices which is integrated in a single crystal semiconductor chip, each display electrode being connected to a respective switching device through a respective conductive path, the display electrodes being divided into a plurality of subsets each of which is formed in respective layers, so that the display electrodes of an upper subset overlap the edges of the display electrodes of a lower subset, the layers being separated by intermediate layers of electrically insulating material, the conductive paths from each higher subset passing through gaps between electrodes of any lower subset nd through the insulating layers to connect their respective electrodes to the corresponding switching devices. The display electrodes when viewed from above are substantially square in shape.

The display electrodes are divided into an even number of subsets each of which is formed in respective layers, such as, for example, two or four subsets in respectively two or four layers. The use of four subsets enables the inter-electrode gap to be completely eliminated.

A preferred construction employs two subsets in two layers in which the alternative electrodes are arranged in the different layers to give a checkerboard arrangement. With such an arrangement the corners of the electrodes would be in physical and electrical contact, and accordingly each electrode is produced with the corners removed. In the preferred construction the electrodes are octagonal. The removal of the corners of the electrodes results in an inter-electrode gap at each corner necessitating the employment of a metal light barrier related to that shown in European patent publication EP-A-0112417.

The invention also provides a method of making a semiconductor integrated display comprising at least the steps of forming an array of individually addressable transistors in a semiconductor wafer; forming a lower insulating film over said transistors, in which are provided via holes above respective transistors for enabling electrical contact to be made; depositing electrically conductive metal in the via holes to make electrical contact with the transistors; forming opaque display electrodes in contact with one subset of vias to form a lower subset of electrodes; forming an insulating film over the edges of the lower subset of electrodes; and forming opaque display electrodes over and in contact with a second subset of vias to form an upper subset of electrodes, so that the display electrodes of the upper subset overlap the display electrodes of the lower subset but are insulated from the lower subset of electrodes by the insulating film protecting their edges and optionally thereafter repeating the following step until the desired number of layers of display electrodes is formed.

In a preferred method of making the display a metallic light barrier is incorporated prior to forming the display electrodes. The step for incorporating the light barrier consists essentially of depositing an opaque metal light barrier, comprising at least one metal different from that last deposited in the via, over the whole array; selectively removing the light barrier from over and around the edges of the vias; forming an upper insulating film over the entire light barrier which also insulates the edges of the light barrier from the via metal; and forming the opaque display electrodes as hereinbefore described. Examples of other various light barriers and method for their formation are described in European patent publication EP-A-0112417.

The foregoing and other objects, features and advantages of the invention will be apparent from the following more particular description of the invention as illustrated in the accompany drawings.

DETAILED DESCRIPTION OF THE INVENTION

Figure 1:
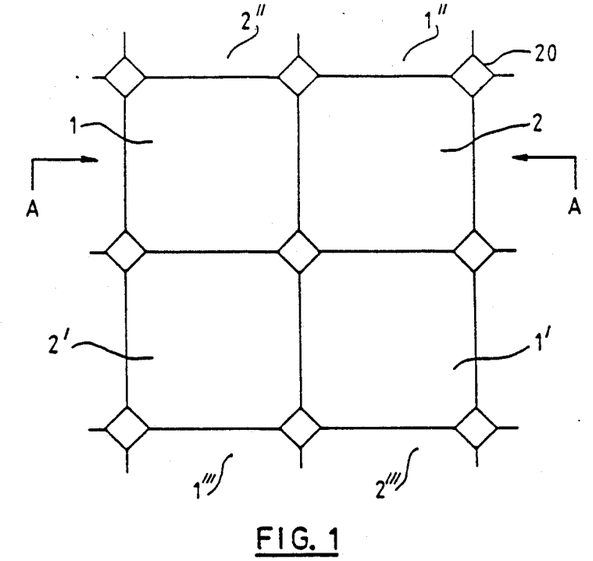
FIG. 1 is a top view of an integrated display structure forming part of a display according to the present invention in which the display electrodes are in two subsets.

Referring initially to FIG. 1, octahedral display electrodes 1, 1', 1'' and 1''' of the lower subset are seen to form with octahedral display electrodes 2, 2', 2'' and 2''' of the upper subset an apparently continuous electrode layer only exposing small areas 20 of electrical insulator at the corners where each octagon meets its neighbors.

Figure 2:
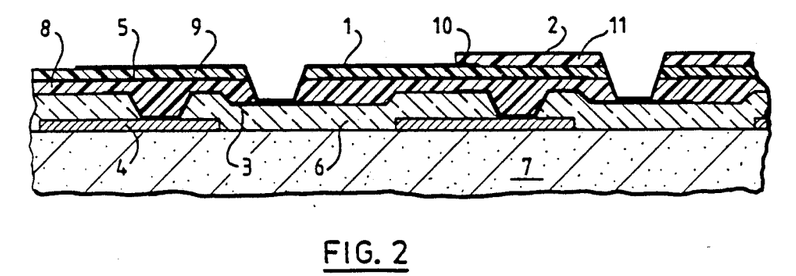
FIG. 2 is a schematic sectional view of FIG. 1 taken along line A—A.

FIG. 2 shows a silicon substrate 7 upon which is formed, by integrated circuit techniques, the display electrode structure of the display structure of the present invention. The substrate 7 has formed therein by conventional N-channel field effect transistor techniques an array of FETs. Each drain of a FET is connected to an overlying silver display electrode 1,2 by means of aluminum drain contact pads 4 and intermediate through via metallurgy 3 comprising a lower layer of titanium, an intermediate layer of gold and an upper layer of chromium (not shown separately).

The FETs are connected, conventionally, by a further pattern of aluminum conductors (not shown) to row and column drivers formed at the periphery of the array. The drivers operate to write and to erase display electrodes selected by the contents of row and column shift registers, also formed in the silicon substrate at the periphery of the array. The electrical arrangement and operation of such matrix addressing and drive circuitry for an electrochromic display is described in U.S. Pat. No. 4,426,643. The electrical arrangement and operation of such matrix addressing and drive circuitry for a liquid crystal display is that conventionally employed in the art.

Because of the need for complete electrical isolation of the display electrodes 1,2 and their associated connection metallurgy from each other several layers of insulation are provided. The first of these is a conventional silicon dioxide (quartz) passivation layer 6 by which the contact pads 4 and the other aluminum conduction lines are originally covered. Because such quartz insulators are susceptible to pinholing, a further organic passivation layer 8 of polyimide is also provided.

Above the polyimide layer 8 is a metallic light barrier 5 consisting of a lower thicker layer of aluminum and an upper thinner layer of chromium (not separately shown). Over the light barrier 5 is a further layer 9 of polyimide to insulate the light barrier 5 from the overlying display electrode 1,2.

The silver display electrode 1 in the lower subset of electrodes is a layer of evaporated silver. Over the edge 10 of the electrode 1 is a further layer 11 of polyimide to insulate the electrode 1 from the overlapping silver display electrode 2 in the upper subset of electrodes. The silver display electrode 2 is a layer of evaporated silver. For use in electrochromic displays the display electrodes 1,2 may have an additional layer of silver electroplated onto the evaporated silver layer. The surface of the display electrodes will in that case be rough to give a matt white appearance.

Returning now to FIG. 1 the display partly illustrated has 96,000 display electrodes (pels) at a density of about 20 pels mm$^{-1}$. The only gap that appears between the active pels is the $4\mu \times 4 \mu m$ square 20 at the corners of the pels. A 28 $\mu m$ pel pitch design thus gives a 98% active pel area. For comparison a display of the type disclosed in European patent publication EP-A-011247 having a 28 $\mu m$ pel pitch and a 3 $\mu m$ etched gap between adjacent pels has an active pel area of 80%.

Figure 3:
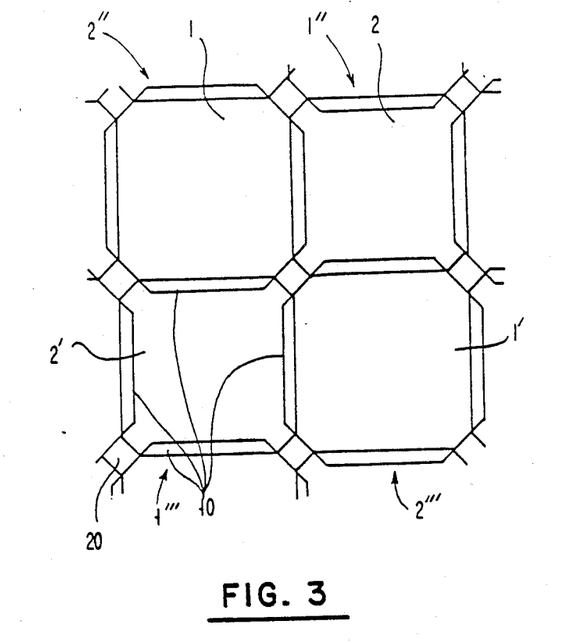
FIG. 3 is a schematic representation of the layers of display electrode showing the overlap between the electrodes in upper and lower subsets.

Referring now to FIG. 3 the final active pel size is determined by the size of the pel mask for the upper subset of pels 2, 2', 2'', 2'''; this is made so that the upper and lower pels are of the same size. The upper pel 2, 2', 2'', 2''' size is therefore the same size as the pel pitch. The lower pels 1, 1', 1'', 1''' are made 4 $\mu m$ larger to provide a 2 $\mu m$ per side overlap 10.

The method of making the integrated display electrode structure of FIGS. 1 and 2 will now be described with reference to FIGS. 4 to 9. The same reference numerals will be used as in FIGS. 1 and 2.

Figure 4:
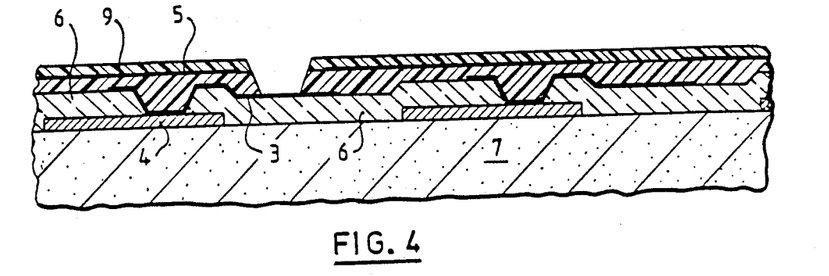
FIGS. 4, 5 and 8 show similar schematic sectional views of various stages in the manufacture of the structure of FIG. 1.

The early stages of the process of the manufacture of the display are by conventional techniques analogous to those described in European patent publication EP-A-0112417 steps 1 to 7 on pages 11 to 15; the structure produced is shown in FIG. 4 hereof.

Referring to FIG. 4 the polyimide insulation layer 9 is baked at 250° C., after which the chromium on top of via metal 3 is etched in alkaline potassium ferrycyanide. This etch exposes bare gold at the bottom of the via.

Figure 5:
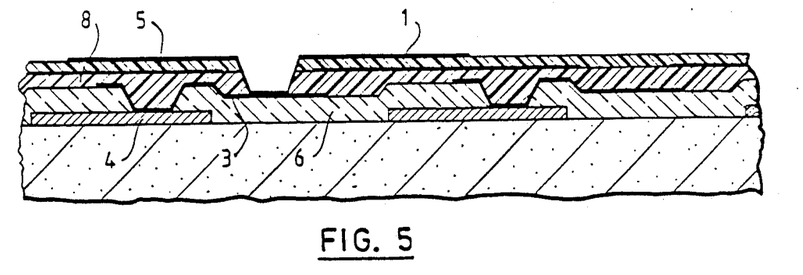

Silver is evaporated over the surface of the structure and patterned using a mask to define the shape of the electrodes 1 in the lower subset to give the structure shown in FIG. 5.

Figure 6:
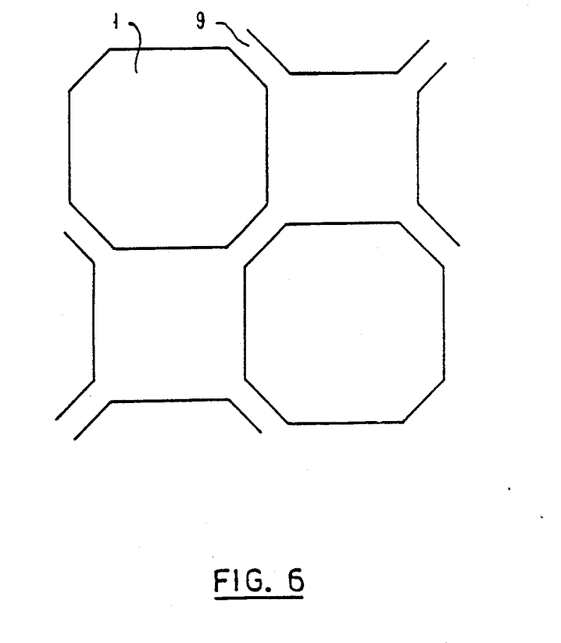
FIGS. 6 and 9 show top views of various stages in the manufacture of the structure of FIG. 1.
Figure 7:
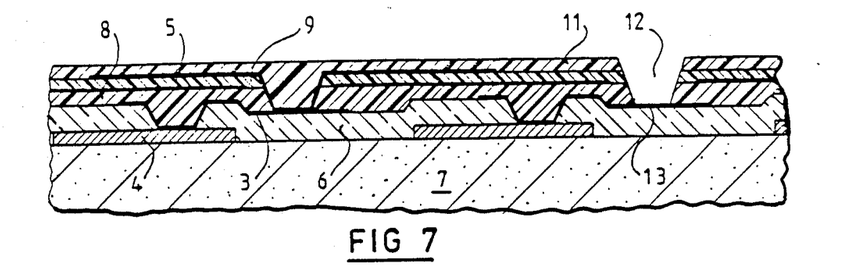

FIG. 6 shows the pattern of silver electrodes 1 on the background polyimide insulator 9. As shown in FIG. 7, a further layer 11 of polyimide is applied over the whole surface of the wafer, and by application of a suitable etch mask, etching the polyimide and removing the mask, holes 12 through layers 11, 9 and 8 are produced communicating with the via 13. The upper layer of polyimide and the metal of via 13 is then treated as hereinbefore defined.

Figure 8:
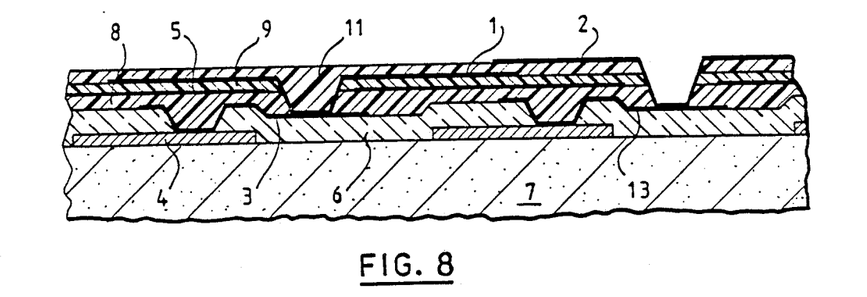

Silver is evaporated over the surface of the structure and is patterned using a mask to define the shape of the electrode 2 in the upper subset to give the structure shown in FIG. 8.

Figure 9:
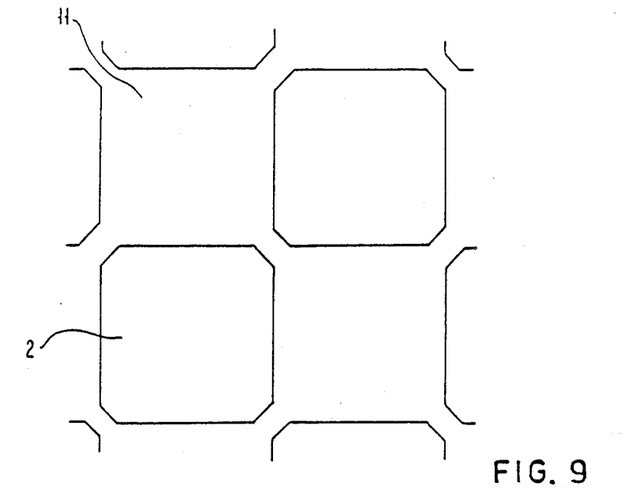

FIG. 9 shows the pattern of silver electrodes 2 on the background polyimide insulator 11.

Etching of the polyimide to reveal the surface of electrodes 1 in the lower subset gives the finished structure as shown in FIGS. 1 and 2.

Figure 10:
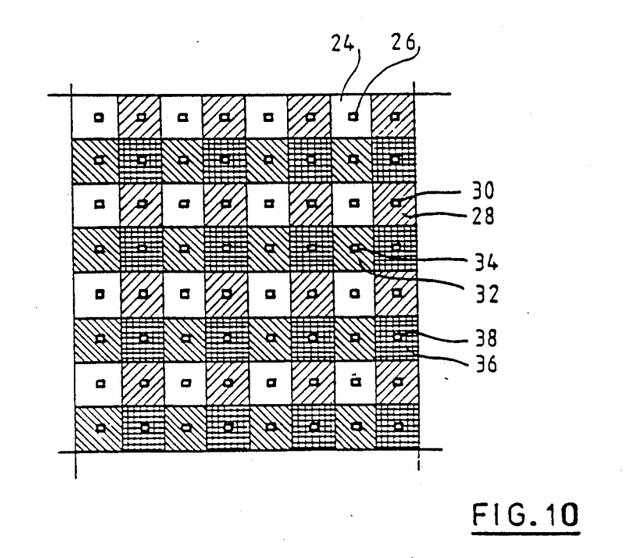
FIG. 10 is a top view of a display according to the present invention in which the display electrodes are in four subsets.

Referring now to FIG. 10, the display electrodes 24, 28, 32, and 36 are in a four layer display in which the display electrodes are in four subsets. The display electrodes are each connected to a via 26, 30, 34, and 38 respectively, which in turn are connected to FET's (not shown).

Figure 11:
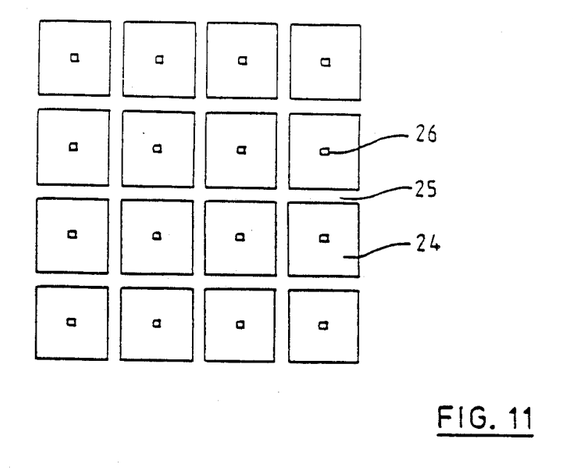
FIGS. 11 to 14 are top views of various stages in the manufacture of the structure of FIG. 10.

FIG. 11 shows the first layer of pels 24 in the four layer display each connected to via 26 and separated from each other by electrical insulator 25.

Figure 12:
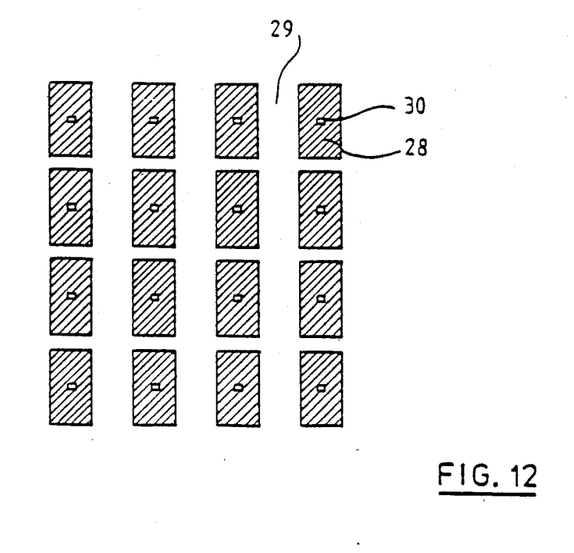

FIG. 12 shows the second layer of pels 28 each connected to a via 30 and separated from each other by electrical insulator 29.

Figure 13:
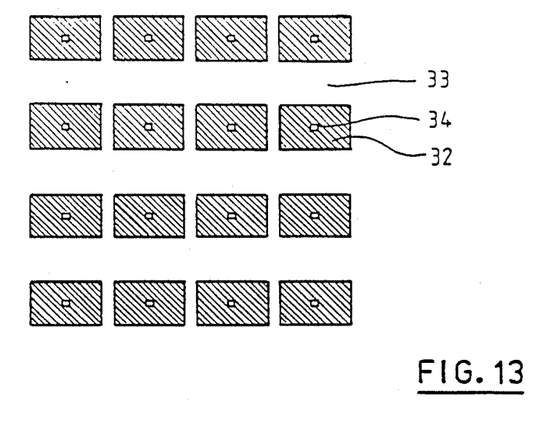

FIG. 13 shows the third layer of pels 32 each connected to a via 34 and separated from each other by electrical insulator 33.

Figure 14:
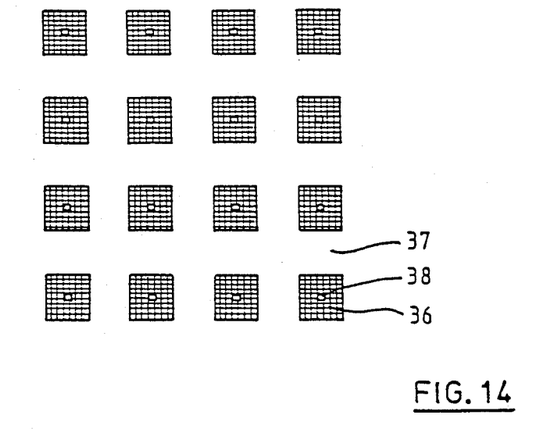

FIG. 14 shows the fourth layer of pels 36 each connected to a via 38 and separated from each other by electrical insulator 37.

Each layer of pels is fabricated in analogous manner to that illustrated herein with reference to FIGS. 4, 5 and 8. The electrical insulator above the pels 24, 28 and 32 in the first, second and third subsets is etched away to leave the structure illustrated in FIG. 10 showing the display electrodes in the four layers as viewed from above as a continuous surface. In the fabrication itself the vias 26, 30, 34 and 38 would not be visible through the display electrode.

While the invention has been described with respect to particular embodiments thereof, it will be apparent to those of skill in the art, that modifications may be made thereto without departing from the spirit and scope of the present invention.

Having thus described our invention, what we claims as new, and desire to secure by Letters Patent is:

1. A semiconductor integrated display in which a matrix of conductive display electrodes is formed over a corresponding matrix of switching devices which are integrated in a single crystal semiconductor chip, each display electrode being connected to only one switching device through a respective conductive path, the improvement to said display comprising: (a) the display electrodes being divided into a plurality of subsets each of which is formed in respective layers, so that the display electrodes of an upper subset overlap the edges of the display electrodes of the lower subset, (b) the layers being separated by intermediate layers of electrically insulating material, (c) the conductive paths from each high subset passing through gaps between electrodes of any lower subset and through the insulating layers to connect their respective electrodes to the corresponding switching devices.

2. A display as claimed in claim 1, in which the display electrodes are substantially square.

3. A display as claimed in claim 1 wherein the display electrodes are divided into an even number of subsets.

4. A display as claimed in claim 3, wherein the display electrodes are in two subsets.

5. A display as claimed in claim 3 wherein the alternate electrodes are arranged in the different layers to give a checkerboard arrangement and wherein each electrode is in the shape of a square with the corners removed.

6. A display as claimed in claim 5 wherein the electrodes are octagonal.

7. A display as claimed in claim 3 wherein the display electrodes are in four subset.

8. An integrated display device comprising:
a substrate having a surface;
a matrix of switching devices formed in the substrate at the surface of the substrate, said matrix comprising first and second sets of switching devices;
a first set of display electrodes arranged above the surface of the substrate substantially in a first plane, each display electrode in the first set of display electrodes being spaced from and electrically insulated from each other display electrode in the first set of display electrodes, each display electrode in the first set of display electrodes being electrically connected to only one switching device in the first set of switching devices, each display electrode in the first set of display electrodes having at least one edge;
at least one second display electrode arranged above a space between two electrodes of the first set of display electrodes, said second electrode having at least one edge arranged above an edge of an underlying electrode of the first set of display electrodes;
a layer of electrically insulating material arranged under the second electrode and between the edge of the second display electrode and the edge of the underlying first display electrode; and
means for electrically connecting the second display electrode to only one switching device in the second set of switching devices, said electrical connection means passing through the layer of electrically insulating material and passing through a space between electrodes of the first set of display electrodes.

9. An integrated display device as claimed in claim 8, characterized in that:
each display electrode in the first set of display electrodes is electrically connected by ohmic contact to one switching device in the first set of switching devices; and
the second display electrode is electrically connected by ohmic contact to the switching device in the second set of switching devices.

10. An integrated display device comprising:
a substrate having a surface;
a matrix of switching devices formed in the substrate at the surface of the substrate, said matrix comprising first and second sets of switching devices;
a first set of display electrodes arranged above the surface of the substrate substantially in a first plane, each display electrode in the first set of display electrodes being spaced from and electrically insulated from each other display electrode in the first set of display electrodes, each display electrode in the first set of display electrodes being electrically connected to one switching device in the first set of switching devices, each display electrode in the first set of display electrodes having at least one edge;
a plurality of second display electrodes, each second display electrode being arranged above a space between electrodes of the first set of display electrodes substantially in a second plane, said second plane being spaced from but substantially parallel to the first plane, each second electrode having edges arranged above edges of underlying electrodes of the first set of display electrodes;

a layer of electrically insulating material arranged under the second display electrodes and between the edges of the second display electrodes and the edges of the underlying first display electrodes; and means for electrically connecting each second display electrode to one switching device in the second set of switching devices, said electrical connection means passing through the layer of electrically insulating material and passing through a space between electrodes of the first set of display electrodes.

* * * * *